(12) United States Patent
Leckebusch

(10) Patent No.: US 9,186,675 B2
(45) Date of Patent: *Nov. 17, 2015

(54) RADIAL SLIDING SEAL SUBASSEMBLY FOR METERING DEVICES, AND METERING DEVICE WITH SUCH A RADIAL SLIDING SEAL SUBASSEMBLY

(71) Applicant: Hamilton Bonaduz AG, Bonaduz (CH)

(72) Inventor: Klaus Leckebusch, Masein (CH)

(73) Assignee: HAMILTON BONADUZ AG, Bonaduz (CH)

( * ) Notice: Subject to any disclaimer, the term of this patent is extended or adjusted under 35 U.S.C. 154(b) by 117 days.

This patent is subject to a terminal disclaimer.

(21) Appl. No.: 14/014,617

(22) Filed: Aug. 30, 2013

(65) Prior Publication Data

US 2013/0341549 A1    Dec. 26, 2013

Related U.S. Application Data

(62) Division of application No. 13/127,511, filed as application No. PCT/EP2008/009319 on Nov. 5, 2008, now Pat. No. 8,557,197.

(51) Int. Cl.
*B01L 3/02* (2006.01)
*B01L 3/00* (2006.01)
(Continued)

(52) U.S. Cl.
CPC . *B01L 3/52* (2013.01); *B01L 3/021* (2013.01); *B01L 3/0217* (2013.01); *F16J 15/3208* (2013.01); *F16J 15/56* (2013.01); *F16K 21/04* (2013.01)

(58) Field of Classification Search
CPC ....... B01L 3/0217; B01L 3/021; B01L 3/565; B01L 2400/0478

USPC ................ 422/501, 504–505, 520–521, 923, 422/926–927; 73/863.32, 864

See application file for complete search history.

(56) References Cited

U.S. PATENT DOCUMENTS 2,255,613 A    9/1941    Fisher et al.
2,342,458 A    2/1944    Davies
(Continued)

FOREIGN PATENT DOCUMENTS

DE    23 38 353 A1    2/1975
DE    2338353 A1    2/1975
(Continued)

OTHER PUBLICATIONS

Search Report cited in German Application 13 189 327.3-1356, dated Dec. 3, 2013, 5 pages.
(Continued)

*Primary Examiner* — Brian R Gordon
(74) *Attorney, Agent, or Firm* — Rothwell, Figg, Ernst & Manbeck, P.C.

(57) ABSTRACT

A metering device for use in syringes and pipetting piston-cylinder arrangements; the metering device includes a sealing component and at least one pretensioning component. The sealing component includes a sealing section which has a sealing surface formed on a working surface formed on either the outer surface of the piston rod facing toward the inner wall of the cylinder or on the inner side of the cylinder facing towards the piston rod. The sealing section also has a pretensioning surface for engaging with a plurality of identical pretensioning components for transferring the radial pretensioning force. The plurality of identical pretensioning components are arranged one after the other in the axial direction. The identical pretensioning components include a spring carrier and a plurality of separately formed radial spring segments compliantly supported at least in the radial direction on the spring carrier.

31 Claims, 5 Drawing Sheets

(51) Int. Cl.
*F16J 15/32* (2006.01)
*F16J 15/56* (2006.01)
*F16K 21/04* (2006.01)

(56) References Cited

U.S. PATENT DOCUMENTS

| | | | |
|---|---|---|---|
| 2,434,485 | A | 1/1948 | Chambers |
| 3,831,816 | A | 8/1974 | Pauliukonis |
| 3,847,389 | A | 11/1974 | Rogers |
| 4,036,064 | A | 7/1977 | Hydo |
| 5,415,843 | A | 5/1995 | Andersson |
| 6,019,004 | A | 2/2000 | Conley et al. |
| 6,926,867 | B1 | 8/2005 | Liu et al. |
| 7,588,732 | B2 | 9/2009 | Buss |
| 2005/0255005 | A1 | 11/2005 | Motadel |
| 2006/0093527 | A1 | 5/2006 | Buss |
| 2011/0027149 | A1 | 2/2011 | Uldry |
| 2011/0088493 | A1 | 4/2011 | Blumentritt et al. |
| 2012/0003129 | A1 | 1/2012 | Rempt et al. |

FOREIGN PATENT DOCUMENTS

| | | |
|---|---|---|
| DE | 34 43 370 A1 | 6/1985 |
| DE | 19951317 A1 | 4/2000 |
| DE | 102 29 788 A1 | 1/2004 |
| DE | 10 2007 016014 A1 | 10/2008 |
| EP | 2 085 104 A1 | 8/2009 |
| FR | 770290 A | 9/1934 |
| GB | 2053413 A | 2/1981 |
| JP | 60-93034 U | 6/1985 |
| JP | H02-8112 U | 1/1990 |
| JP | H02213358 A | 8/1990 |
| JP | H09144884 A | 6/1997 |
| JP | 2001-513025 A | 8/2001 |
| JP | 2008126540 A | 6/2008 |
| WO | 99/32870 A1 | 7/1999 |
| WO | 2008/076817 A1 | 6/2008 |
| WO | 2009125337 A1 | 10/2009 |

OTHER PUBLICATIONS

Search Report cited in German Application 13 189 324.0-1356, dated Dec. 3, 2013, 5 pages.
Japanese Office Action issued for Japanese Patent Application No. 2013-110711 dated Apr. 7, 2014, 9 pages.

RADIAL SLIDING SEAL SUBASSEMBLY FOR METERING DEVICES, AND METERING DEVICE WITH SUCH A RADIAL SLIDING SEAL SUBASSEMBLY

RELATED APPLICATIONS

This application is a divisional of Ser. No. 13/127,511, U.S. Pat. No. 8,557,197; filed May 4, 2011 which is 35 U.S.C. 371 National Phase Entry Application from PCT/EP2008/009319, filed Nov. 5, 2008, the disclosures of which are incorporated herein in their entirety by reference.

BACKGROUND OF THE INVENTION

The present invention relates to a radial sliding seal subassembly with a sealing component and with at least one pretensioning component co-operating therewith, wherein the sealing component comprises a sealing section extending in the axial direction and in the circumferential direction, on which a sealing surface facing in a first radial direction is formed for sealing and at least in the axial direction sliding contact on a working surface extending in the axial direction and in the circumferential direction, and on which a pretensioning surface facing in a second radial direction opposite to the first radial direction is formed, for engagement with the pretensioning component for transferring the radial pretensioning force.

Such radial sliding seal subassemblies are used in particular in metering devices containing piston-cylinder arrangements. Such metering devices are for example syringes, pipetting devices and the like.

In such metering devices the radial sliding seal subassemblies of the generic type serve as a rule to seal a radial gap between a cylinder wall and a wall of the piston rod moving relative to the cylinder.

Since this radial gap as a rule extends all the way round in the circumferential direction, the sealing section, in particular the sealing surface formed therein, as well as the working surface preferably extend all the way round in the circumferential direction.

With known metering devices of the prior art the sealing component is frequently slid inside out over an O-ring as radial sliding seal subassembly, which in the installed state of the radial sliding seal subassembly exerts a radial pretensioning force on the sealing component. The O-ring at the same time presses against the pretensioning surface of the sealing section and thereby radially pretensions the sealing surface opposite the pretensioning surface in the radial direction.

A disadvantage of these known types of radial sliding seal subassembly is on the one hand the fact that the radial pretensioning force exerted by the O-ring as the pretensioning component varies very greatly on account of large dimensional tolerances and a large variation of the determining material properties of the known rubber-elastic pretensioning components.

SUMMARY OF THE INVENTION

An object of the present invention is therefore to develop a generic radial sliding seal subassembly so that it provides a uniform radial pretensioning force as reproducible as possible, with which the sealing surface can be pretensioned in the radial direction.

This object is achieved according to the invention by a radial sliding seal subassembly of the type mentioned in the introduction, in which the pretensioning component comprises a spring carrier as well as a plurality of separately formed radial spring segments that are resiliently supported at least in the radial direction on the spring carrier.

By providing a plurality of separately formed radial spring segments a defined radial pretensioning force can be provided or even adjusted for each circumferential section of the pretensioning surface, associated with a radial spring segment.

In order to support the radial pretensioning force exerted by the radial spring segments on the sealing component, the radial spring segments are supported on a spring carrier of the pretensioning component. The spring carrier is thus able to absorb the forces of reaction to the pretensioning forces exerted by the individual radial spring segments.

Whenever the present application speaks of the radial spring segments being "resiliently supported in the radial direction" on the spring carrier, then this is intended to mean that at least one section of the radial spring segments, transmitting the pretensioning force is elastically displaceable in the radial direction under the action of a radial force according to the variable or constant spring stiffness of the relevant radial spring segment, and the section of the radial spring segment, transmitting the pretensioning force is restored substantially to its unloaded position after the action of the force has ceased. In this connection it is not excluded that the radial spring segments can in addition also be resiliently supported or movable in further directions.

In principle, in a less preferred embodiment a radial spring segment can be formed using a helical compression spring or a tension bolt spring with a variable length in the radial direction. This results however in a considerable and often unnecessary installation expenditure, although a very accurately adjustable radial pretensioning force on each individual radial spring segment can be achieved by such helical springs.

In principle a sealing component can also be radially pretensioned by a plurality of pretensioning components. In this case, in order to avoid unnecessarily high manufacturing costs it is advantageous if the individual pretensioning components are formed identically, so that only one type of pretensioning component has to be manufactured.

If a plurality of pretensioning components is desired, then the individual pretensioning components can be arranged one after the other in the axial direction. In this connection axially adjacent pretensioning components or groups of pretensioning components can be provided oriented in the same or opposite direction. In this way differently well-defined radial pretensioning states adapted to different sealing component geometries can be achieved.

Radial sliding seal subassemblies with very small geometrical dimensions and at the same time extremely low production and/or installation costs can be obtained if at least one radial spring segment is connected in the region of one of its axial longitudinal ends to the spring carrier and is formed with a pretensioning axial section, axially spaced from the axial longitudinal end, for contact on the pretensioning surface. In this case a radial spring segment can project in the manner of a leaf spring from the spring carrier in the axial direction and with its free longitudinal end can be springy in the radial direction with movement forms known from an idealised unilaterally clamped beam. In this connection the pretensioning axial section is provided on a radial spring segment, preferably on a region comprising the free axial longitudinal end of the radial spring segment. This need not necessarily be the case however: by suitably shaping the leaf spring-like radial spring segment an axial section lying between the axial longitudinal end connected to the spring carrier and the free axial longitudinal end of the radial spring segment can also be designed as a pretensioning axial section, so long as on the basis of this shape it is designed for contact with the pretensioning surface of the sealing component, i.e. in the installed state of the radial sliding seal subassembly it actually lies against the pretensioning surface.

For the effective utilisation of the radial pretensioning force it is advantageous if the pretensioning surface is located in the axial direction within that axial region in which also the sealing surface is located, or the two surfaces axially overlap. This need not be so however.

Since the spring carrier can as a rule perform a plurality of functional tasks, of which the retention of the radial spring segments is only one, it is advantageous if the spring carrier for retaining radial spring segments has a carrier section extending in the circumferential direction, from which at least one radial spring segment projects in the axial direction.

Since, as described in the introduction, the sealing surface is as a rule designed to extend all the way round in the circumferential direction, it is advantageous if the carrier section too is designed to extend all the way round in the circumferential direction.

In order to keep the necessary number of components for forming a radial sliding seal subassembly according to the invention as low as possible, it is advantageous if as many as possible, preferably all, radial spring segments project from the carrier section in the axial direction.

In this connection it may be desirable to allow the radial pretensioning force to act on the sealing component over as large an axial region as possible, in which case it may be conceivable to allow radial spring segments to project in opposite axial directions from the carrier section.

A preferred pretensioning component, since its axial dimensions are as small as possible, can however then be obtained if the radial spring segments projecting from the carrier section all project in the same axial direction. With the preferred use of the radial sliding seal subassembly described here in a metering device, a normally provided variable volume in the metering device can be formed as large as possible if the radial spring segments project from the carrier section in the axial direction away from the variable hollow space.

Furthermore, in a less preferred embodiment it can be envisaged to arrange the radial spring segments axially offset with respect to one another. This is however less desirable on account of the resultant large axial structural length of the pretensioning component.

The exertion of a radial pretensioning force by the individual radial spring segments on the sealing component over substantially the whole extent of the sealing section in the circumferential direction can be ensured if the radial spring segments are arranged adjacently in the circumferential direction.

An advantageous radial sliding seal subassembly, which can be formed from as few individual parts as possible, can be obtained if at least a part of, preferably all, radial spring segments is/are formed integrally with the carrier section. For this purpose the whole pretensioning component can particularly preferably be formed as a one-part component.

Structurally the pretensioning component, particularly if it is to be formed as a one-part component, can for simplicity of design and arrangement have a tubular section that comprises a plurality of axial slits adjacent in the circumferential direction, whose axial length is shorter than that of the tubular section, and which preferably run starting from one axial longitudinal end of the tubular section to the in each case other axial longitudinal end of the tubular section. The tubular section can thus be designed "crown-shaped", with a ring as carrier section and leaf spring-like radial spring segments projecting therefrom in the same axial direction.

In order to ensure that the pretensioning component in the installed state of the radial sliding seal subassembly exerts a desired radial pretensioning force on the sealing section of the sealing component, the pretensioning component can be structurally formed so that the pretensioning axial segment in the unloaded state projects beyond the carrier section in the radial pretensioning action direction. The radial sliding seal subassembly is as a rule designed to be mounted on a component with which it can move jointly relative to another component.

In the case particularly considered here of the use of the radial sliding seal subassembly according to the invention in a metering device with a piston-cylinder arrangement, the radial sliding seal subassembly therefore can with respect to one of the components consisting of cylinder and piston or piston rod be provided fixedly on this and can move jointly with this relative to the respective other component consisting of cylinder and piston or piston rod.

Especially in the case where the radial spring segments are formed at least partly like spring leaves as described above, with the aid of the radial spring segments the pretensioning component and thus the radial sliding seal subassembly as a whole can be arranged very simply and advantageously in a locking manner on a carrier component fixedly accommodating the radial sliding seal subassembly, if at least a part of the radial spring segments has a radial stop projection on its side pointing away from the pretensioning surface in the installed state.

Especially therefore if the pretensioning axial section, as illustrated above as an advantageous modification of the present invention, in the unloaded state projects in the radial pretensioning action direction with respect to the carrier section, the pretensioning component can be arranged in a locking manner due to the aforedescribed radial stop projections on at least a part of the radial spring segments, preferably on all radial spring segments, on a carrier part, such as for example a piston rod having a matching stop geometry, by utilising the elastic radial mobility of the radial spring segments, the force required to release the locking and thus to separate the pretensioning component and carrier component then being increased further when, in the fully installed state, the pretensioning axial sections are forced against their material and/or dimensional elasticity from the working surface in order to achieve a radial pretensioning force opposite to the desired action direction of the radial pretensioning force. Consequently the radial pretensioning force with which the radial spring segments press the sealing section of the sealing component against the working surface then serves at the same time as a locking force of the pretensioning component on the carrier component carrying it.

In order to ensure that the sealing component and the pretensioning component during the operation of the radial sliding seal subassembly substantially retain their intended axial relative position, in other words are not displaced or only to a negligible extent relative to one another in the axial direction, it may be envisaged that the pretensioning component has a securement device to secure the relative position of the sealing component and pretensioning component at least in the axial direction. In this connection the securement in the axial direction has priority since the sealing surface of the sealing component is in any case relatively movable in the axial direction in relation to the working surface on which it rests. As is already known from the prior art, the securement device can be designed as at least one securement projection, preferably a plurality of securement projections. These can project in a toothed manner from the pretensioning component in the radial direction, and optionally for a better rear engagement also with a component in the axial direction, from the pretensioning component to the sealing component. Such securement projections can from the manufacturing aspect advantageously extend in the circumferential direction over the whole length of the pretensioning component, i.e. can be formed all the way round on the pretensioning part.

According to a further advantageous modification of the present invention the securement device in the region of the pretensioning axial section can be provided on one or more radial spring segments, so that the radial pretensioning force with which the radial spring segment presses against the sealing component increases the positional security of the sealing component and pretensioning component relative to one another.

Alternatively or in addition to the above described fastening of the pretensioning component on a carrier component, it may be envisaged for this purpose that the pretensioning component has a fastening section extending in the radial direction, for fastening the pretensioning component to a primary structure, such as a metering device. The primary structure indicated here can be identical to the carrier component identified above. The radial fastening section can with a very slight axial expansion ensure an extremely reliable fastening to the principal structure. For example, the fastening section can be formed as a radial flange, which advantageously extends over the whole circumferential length of the pretensioning component, and particularly preferably is provided all the way round in the circumferential direction.

A further major disadvantage of the rubber-elastic pretensioning components known in the prior art is their temperature behaviour. The pretensioning component described here can be used in an operationally reliable manner in a very wide temperature range, for example at operating temperatures up to 200° C., if the pretensioning component is formed of metal at least in the region of the radial spring segments, preferably also in the region of the spring carrier.

The sealing component is formed at least in the sealing section, preferably completely, from a flexible elastic material, such as an elastomer or a thermoplast.

According to an advantageous modification of the present invention, which can be used in particular when the sealing surface of the sealing component is to be pressed with a particularly high force or pressure against the working surface, the radial sliding seal subassembly can comprise a clamping force generating component that is movable relative to the pretensioning component. The clamping force generating component is in this connection preferably at least movable relative to the pretensioning component between a first position, in which the clamping force generating component co-operates with the pretensioning component so that the pretensioning component exerts a lower radial pretensioning force on the sealing component, and a second position in which the clamping force generating component co-operates with the pretensioning component so that the pretensioning component exerts a higher radial pretensioning force on the sealing component. The pretensioning force of the first position can also be zero.

In this connection, for an installation space-saving arrangement the clamping force generating component can in a simple manner be formed as a ring surrounding the pretensioning component at least in the region of its radial spring segments. For a better definition of the radial pretensioning force that can be generated by the clamping force generating component, a radial projection is preferably formed on the clamping force generating component formed as a ring, which projects from the clamping force generating component to the pretensioning component.

For a particularly simple operation of the clamping force generating component, it may further be envisaged that at least a part of, preferably all, radial spring segments on their side facing away from the sealing component are formed inclined in the axial direction, so that an axial displacement of the clamping force generating component formed as a ring exerts on contact with the side of the radial spring segments, inclined in the axial direction a variously large radial pretensioning force on the sealing component depending on the displacement path.

Furthermore the present invention relates to a metering device, in particular a syringe, pipetting piston-cylinder arrangement and the like, with a cylinder and a piston rod, both of which extend along an axial direction and are movable relative to one another in this axial direction, and also with a radial sliding seal subassembly as described above. In this connection, according to a first possible embodiment the working surface can be formed on an inside of the cylinder facing towards the piston rod. In this case the radial sliding seal subassembly can be used to seal a piston or piston rod with respect to a cylinder, so that the sealing component can be used directly to demarcate a metering cavity alterable by relative movement of the piston rod and cylinder, the metering cavity then being bounded by a section of the cylinder wall, a cylinder front side with an outlet/inlet opening and just the sealing component. At least the sealing component can contribute to the demarcation of the metering cavity.

For this, it may be envisaged that the pretensioning component in the region of the metering longitudinal end of the piston rod, protruding into the cylinder is fastened to the said rod for joint movement. In this case the metering cavity can be designed having as large a usable volume as possible, if the radial spring segments, as already mentioned in the introduction, are provided and arranged projecting from the carrier section in the direction away from the metering cavity.

In addition or as an alternative to the possibility already described above of locking the pretensioning component on the piston or on the piston rod of a metering device with a piston-cylinder arrangement, the pretensioning component, particularly if the radial flange mentioned above is used, can be riveted to the piston rod. In addition or alternatively a section of the pretensioning component, if this forms a ring closed in the circumferential direction, can be shrink fitted on to the piston rod or piston. In this case too it is advantageous for reasons of optimal utilisation of the installation space if the radial spring segments are provided and arranged projecting from the carrier section in the direction away from the metering cavity.

If a further reduction in the number of components necessary for forming the metering device described here is desired, then it can also be envisaged that the pretensioning component is formed at least partly, preferably completely, in one piece with a section of the piston rod.

Alternatively or in addition, in a metering device described above the working surface can also be formed on an outside of the piston rod, facing the inner wall of the cylinder. This is desirable if for example it is not the metering cavity described above, but instead the outlet point of the piston rod from the cylinder, that is to be sealed with the radial sliding seal subassembly. In this case the radial sliding seal subassembly according to the invention is arranged on the longitudinal end of the cylinder that is opposite the cylinder longitudinal end with the metering opening.

The present invention is described hereinafter with the aid of examples of implementation and with reference to the accompanying drawings, in which:

DETAILED DESCRIPTION OF THE INVENTION

Figure 1:
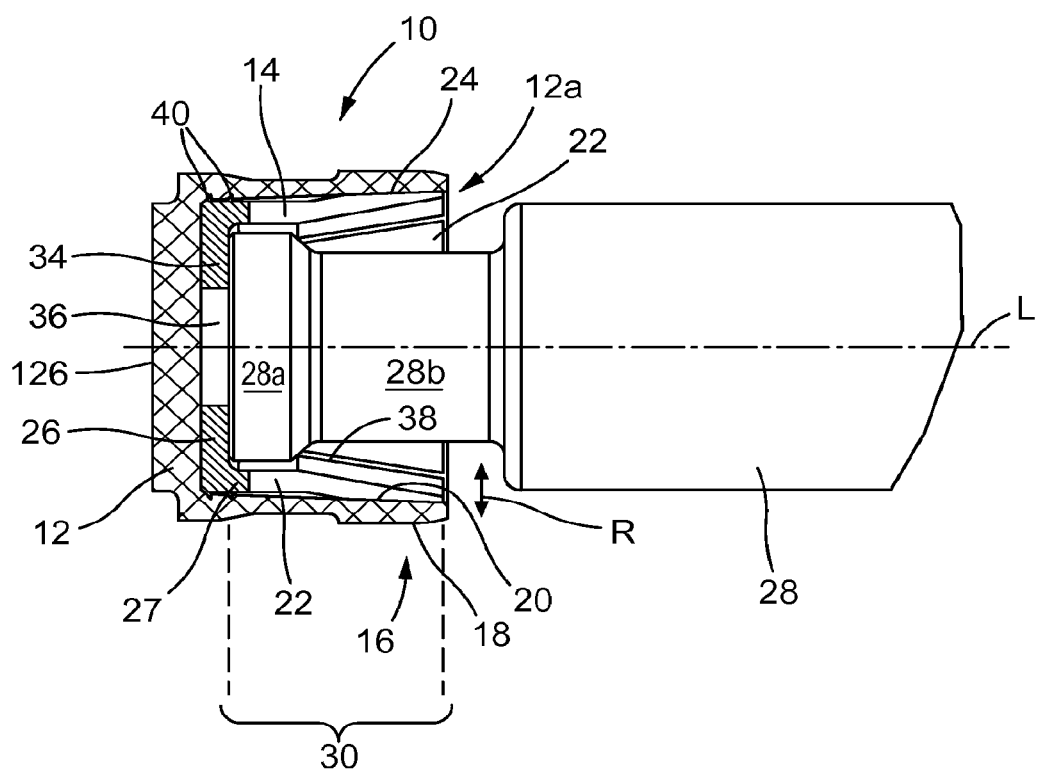
FIG. 1 is a longitudinal sectional view through a first embodiment of a radial sliding seal subassembly according to the invention, arranged on a longitudinal end of a piston rod not shown in cross-section.

In FIG. 1 a first embodiment of a radial sliding seal subassembly according to the invention shown in longitudinal cross-section is generally denoted by the reference numeral 10. This comprises a pot-shaped sealing component 12 that externally surrounds a pretensioning component 14.

The sealing component 12 has in the region of its open longitudinal end 12a a sealing section 16, which comprises on its radially outer side a sealing surface 18 all the way round in the circumferential direction and extending a predetermined amount in the axial direction, a pretensioning surface 20 being formed in the region of the sealing section 16 on the side facing in the radially opposite direction, on which surface rests a plurality of radial spring segments 22 each having a pretensioning axial section 24.

The pretensioning component 14 has in addition to the radial spring segments 22 a spring carrier 26, with whose carrier section 27 lying next to the radial spring segments in the axial direction the radial spring segments 22 are integrally formed and project in the direction of the longitudinal axis L of the piston rod 28. The radial spring segments 22, which are arranged adjacently around the longitudinal axis L in the circumferential direction, all project in the same direction from the spring carrier 26.

Figure 2:
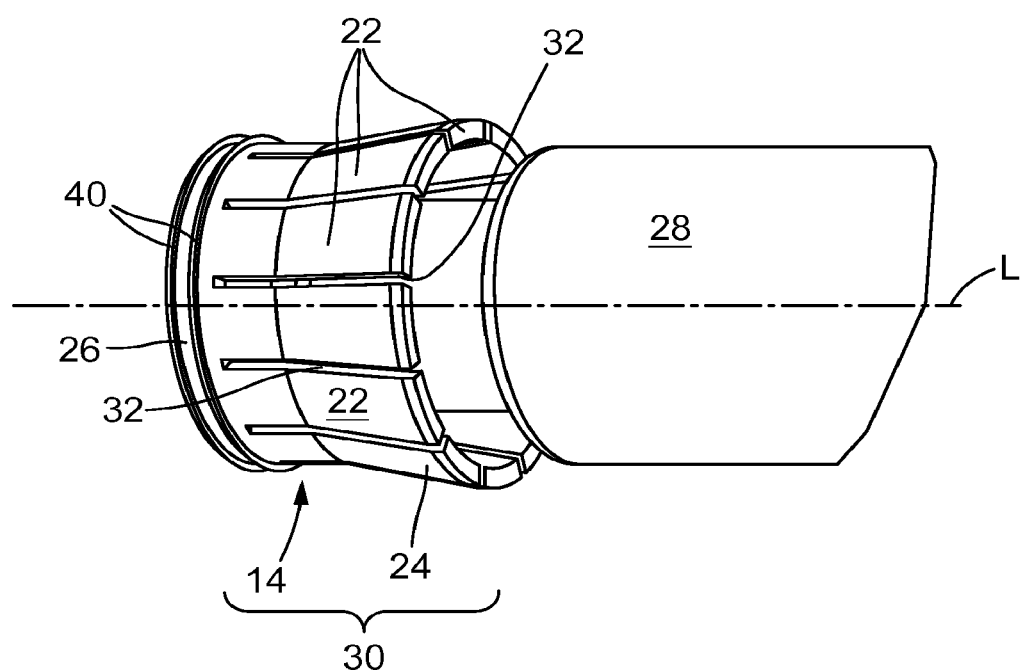
FIG. 2 is a perspective, non-cross-sectional partial representation of the first embodiment of FIG. 1.

As can be seen more readily from FIG. 2, the pretensioning component 14 is crown-shaped, with a tubular section 30 in which the radial spring segments 22 are separated from one another by slits 32, whose axial length is shorter than that of the tubular section 30, so that the tubular section 30 can be formed starting from a tubular semi-finished article by introducing the slits 32.

The pretensioning component 14 has in addition a radially inwardly directed radial flange 34, which serves for fastening the pretensioning component to a longitudinal end 28a of the piston rod 28, that in the installed state protrudes into a cylinder. To this end a substantially central opening 36 is provided on the radial flange 34, with which the pretensioning component 14 can be riveted to the longitudinal end 28a of the piston rod 28.

In addition, a radial projection 38 indicated by a dotted line can be provided on the side of the radial spring segments 22, facing away from the pretensioning surface 20 in the radial direction, which projection can serve for the locking of the pretensioning component 14 on a longitudinal end 28a of the piston rod 28, formed as a stop head.

In order to generate a radially outwardly acting pretensioning force in FIG. 1, the radial spring segments 22 are provided resiliently supported on the spring carrier 26 with their free longitudinal end in the radial direction (see double arrow R) referred to the central longitudinal axis L of the piston rod 28.

As already mentioned above, in the installed state the longitudinal end 28a of the piston rod 28, which for the possibility likewise discussed above of locking the pretensioning component 14 thereon is formed having a larger diameter than the axially following shoulder section 28b, is securely inserted into the interior of a metering device cylinder (not shown). The front side 12b of the elastomeric sealing component 12 thereby demarcates a metering cavity of the metering device.

In order to ensure the positional securement of the metering component 12 on the pretensioning component 14 projections 40 arranged all the way round in the circumferential direction are provided on the pretensioning component 14, in this case in the region of the spring carrier 26. In the installed state shown in FIG. 1 these penetrate the elastomeric material of the sealing component 12.

This positional securement effect can also be reinforced if, as an alternative or in addition, further securement elements are provided in the region of the pretensioning axial section 16 on the side of the radial spring segments 22, facing towards the sealing component 12 in the installed state.

The embodiment of the radial sliding seal subassembly 10 illustrated in FIG. 1 is shown in perspective in FIG. 2 and without the sealing component 12.

From this it can be seen that the pretensioning axial sections 24 of the radial spring segments 22 in the undeformed state of FIG. 2 project radially in the direction of the pretensioning action, i.e. in this case radially outwardly, beyond the outer diameter of the spring carrier 26.

Then, if the sealing component 12 is slipped at least with its sealing section 16 over the pretensioning axial section of the pretensioning component 14, the radial spring segments 22 are bent radially inwardly against their material elasticity and press with a correspondingly accurately adjustable spring force (pretensioning force) radially outwardly against the pretensioning surface 20, whereby the sealing surface 18 of the sealing component 12 is pretensioned radially outwardly in the desired manner.

Figure 3:
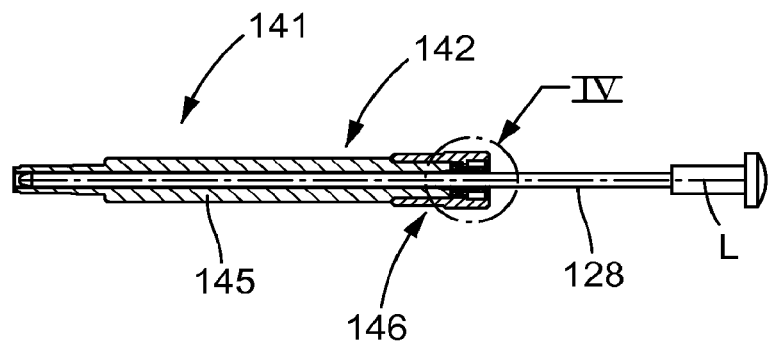
FIG. 3 is a longitudinal sectional view of a metering device with a second embodiment of a radial sliding seal subassembly according to the invention.

FIG. 3 shows a second embodiment of a radial sliding seal subassembly according to the invention in the installed state in a metering device.

Figure 4:
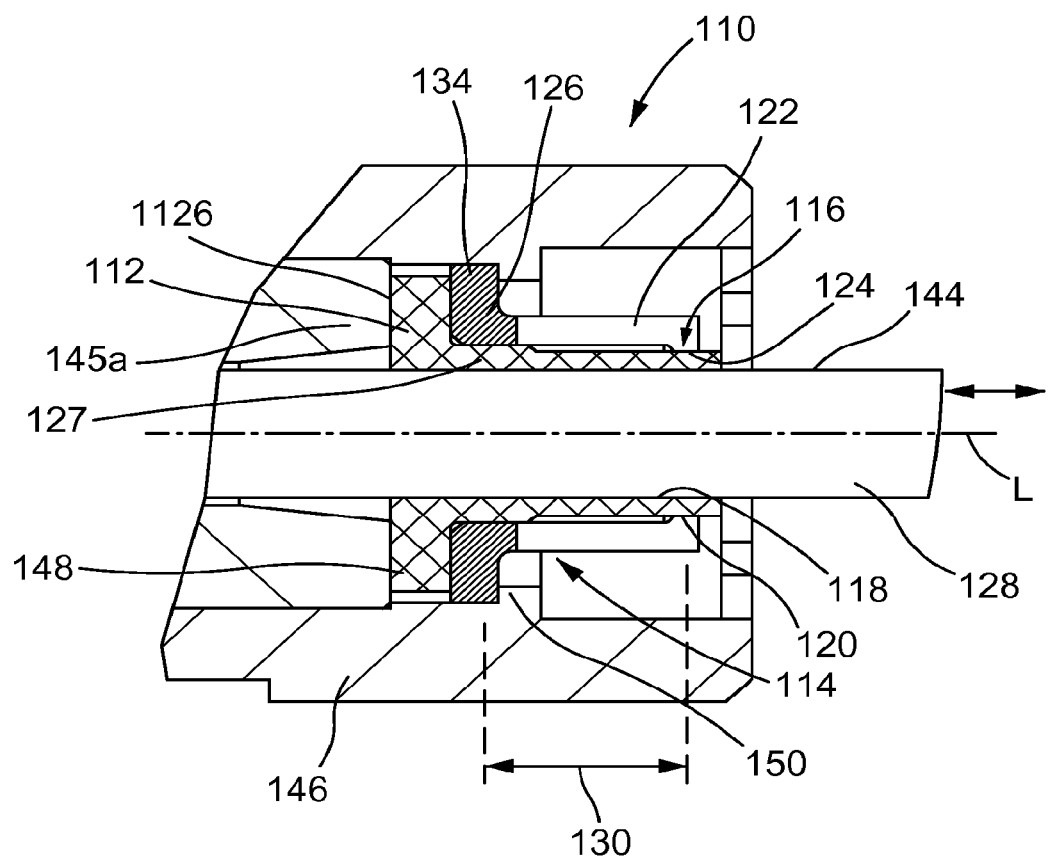
FIG. 4 is a longitudinal sectional view of the detail IV in FIG. 3.
Figure 5:
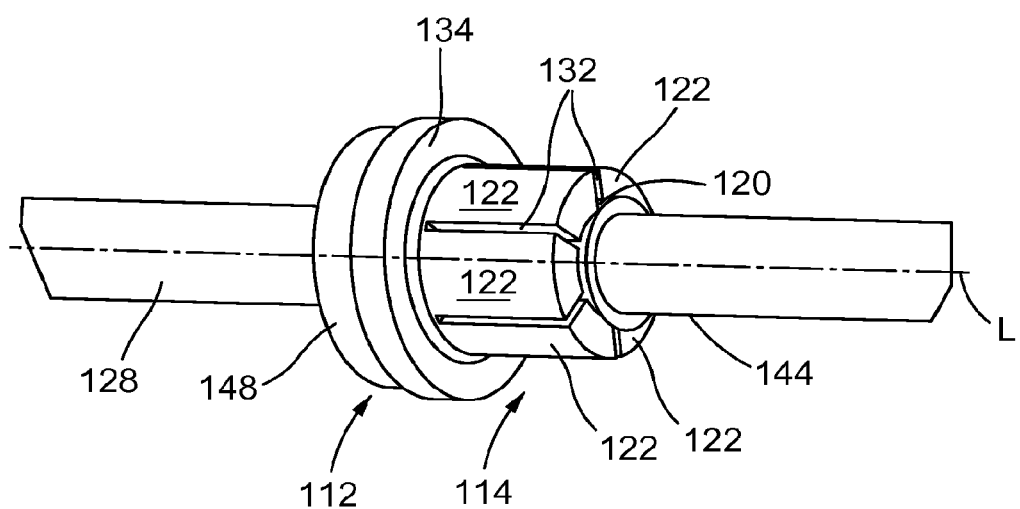
FIG. 5 is a perspective view of the second embodiment of a radial sliding seal subassembly, provided on a piston rod.

Identical structural parts as in the first embodiment of FIGS. 1 and 2 are provided with the same reference numerals in the second embodiment of FIGS. 3 to 5, but in each case increased by 100. The second embodiment is discussed only insofar as it differs from the first embodiment, to the description of which reference is otherwise expressly made.

In FIG. 3 a metering device is generally denoted by the reference numeral 141. This device comprises a cylinder 142, in which a piston rod 128 is accommodated in a movable manner relative to the cylinder along the longitudinal axis L of the piston rod. The piston rod longitudinal axis L is at the same time also the longitudinal axis of the cylinder 142.

The cylinder 142 is formed in several parts, with a cylinder main body 145 and a closure and installation subassembly 146, which at the outlet side of the piston rod 128 from the cylinder 142 is connected to the cylinder main body 145. In FIG. 4 it can be seen that the working surface 144 is formed by the outer surface of the piston rod 128, against which the sealing surface 118 of the sealing component 112, facing radially inwardly, i.e. towards the piston rod longitudinal axis L, therefore rests.

Consequently the pretensioning surface 120 of the sealing component 112 of the second embodiment faces radially outwardly. The radial spring segments 122 lie with their pretensioning axial section 124 against the pretensioning surface 120 of the sealing component 112 and press the sealing section 116 of the sealing component 112 against the working surface 144.

The pretensioning force exerted by the radial sliding seal subassembly 110 of the second embodiment thus acts in the radially opposite direction compared to the first embodiment.

Accordingly the pretensioning component 114 is provided with a radially outwardly facing fastening flange 134. The same also applies to the sealing component 112, whose front surface 112b is formed on a holding flange 148 running radially outwardly all the way round.

The radial sliding seal subassembly of the second embodiment can be fastened very simply in a sandwich-like manner to the metering device 141, by applying the radial fastening flange 134 in an axial direction, in this case in the withdrawal direction of the piston rod 128 from the cylinder 142, against a radially inwardly pointing radial projection 150 of the closure and installation subassembly 146. In the opposite axial direction the holding flange 148, which together with the remaining one-piece sealing component 112 is made of elastomeric material, rests against the fastening flange 134, so that this flange arrangement can be fixed and pretensioned by an axial end 145a of the cylinder main body 145 against the radial projection 150. The fixing can for example be effected in a simple manner by screwing the closure and insulation subassembly 146 on to the cylinder main body, whereby due to the flexible elastic properties of the elastomeric sealing component material not only is a fixing of the sealing component 112 and pretensioning component 114 on the metering device 141 achieved, but also on account of the "action=reaction" principle a securement of the closure and installation subassembly 146 on the cylinder main body 145 is also achieved.

FIG. 5 shows a partial sectional perspective view of the second embodiment without the cylinder 142.

Figure 6:
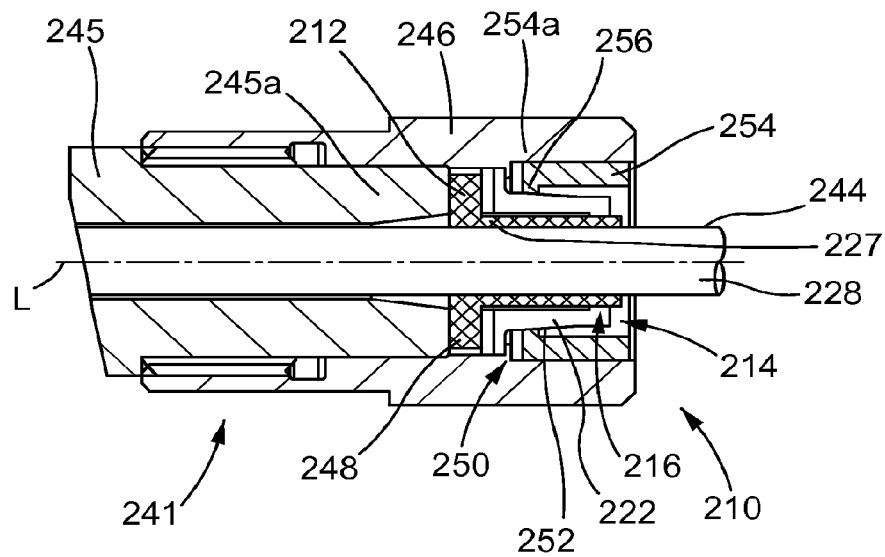
FIG. 6 is a longitudinal sectional view of a metering device with a third embodiment of a radial sliding seal subassembly according to the invention.

FIG. 6 illustrates a metering device with a third embodiment of a radial sliding seal subassembly according to the invention. The same structural parts as in the second embodiment of FIGS. 4 and 5 are provided in FIG. 6 with the same reference numerals, but in each case increased by 100. Otherwise reference is expressly made to the description of FIGS. 4 and 5.

Since the third embodiment of FIG. 6 substantially corresponds to the second embodiment, this will be described only insofar as it differs from the already described second embodiment.

The difference between the third embodiment of the radial sliding seal subassembly and the second embodiment is that on the one hand the radial surface 252 of the radial spring segments 222, facing away from the sealing component 212 is formed inclined to the longitudinal axis L of the piston rod 228. In the example illustrated in FIG. 6 the outer radial surface 252 is conically shaped, the external diameter of the assembly formed by the radial spring segments 222 increasing towards the cylinder main body 245.

Furthermore the pretensioning component 214, in region of the radial spring segments 222, is surrounded radially outwardly by a clamping ring 254, on whose longitudinal end 254a lying deeper in the metering device 241 is formed a radial projection 256 facing towards the outer radial surface 252 of the radial spring segments 222.

The clamping ring 254 is movable in the direction of the longitudinal axis L of the piston rod 228 at least during installation of the metering device 241. If the clamping ring 254 is inserted into the metering device, i.e. displaced towards the left in FIG. 6, the radial projection 256 comes into contact with the conical radial surface 252 of the radial spring segments 222, so that on further displacement of the clamping ring 254 into the metering device 241 the radial spring segments 222 are increasingly forced by the radial projection 256 against the piston rod 228, whereby the radial pretensioning force exerted by the radial spring segments 222 on the sealing component 212 is increased.

The clamping ring 254 or in general a clamping force generating component can then, once a desired radial pretensioning force has been achieved by the clamping force generating component, be fixed in its position relative to the pretensioning component, for example by bonding, welding and the like, in order to ensure that the radial pretensioning force is constantly exerted on the sealing component.

Figure 7:
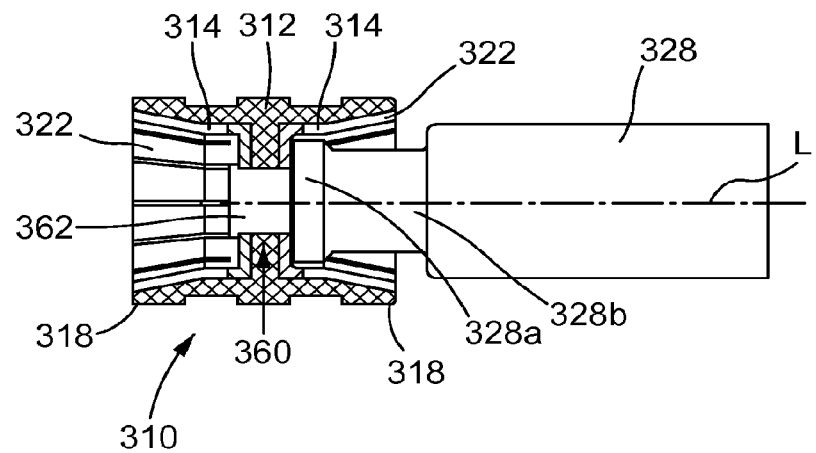
FIG. 7 is a longitudinal sectional view of a metering device with a fourth embodiment of a radial sliding seal subassembly according to the invention.

FIG. 7 shows a longitudinal sectional view through a fourth embodiment of a radial sliding seal subassembly according to the invention, similar to the first embodiment, which is arranged on a piston rod.

The same structural parts as in FIG. 1 are provided with identical reference numerals, but in each case increased by 300.

The fourth embodiment of FIG. 7 is discussed only insofar as it differs from the first embodiment of FIGS. 1 and 2, to the description of which reference is hereby expressly made.

The pretensioning component 314 in FIG. 7 is completely identical to the pretensioning component 14 of FIG. 1, though the sealing component 312 differs in that it can accommodate two pretensioning components 314 in opposite axial orientations. This arrangement of pretensioning components 314 is also termed a X-arrangement, since in the longitudinal section of FIG. 7 the radial spring segments 322 of the two pretensioning components 314 are arranged and aligned in such a way that, starting from the fastening point 360 with the rivet 362, they extend in both axial directions away from the longitudinal axis L of the piston rod 328.

With the arrangement illustrated in FIG. 7 a very long sealing section of the sealing component 312 in the axial direction can be achieved on a working surface not shown in FIG. 7.

Figure 8:
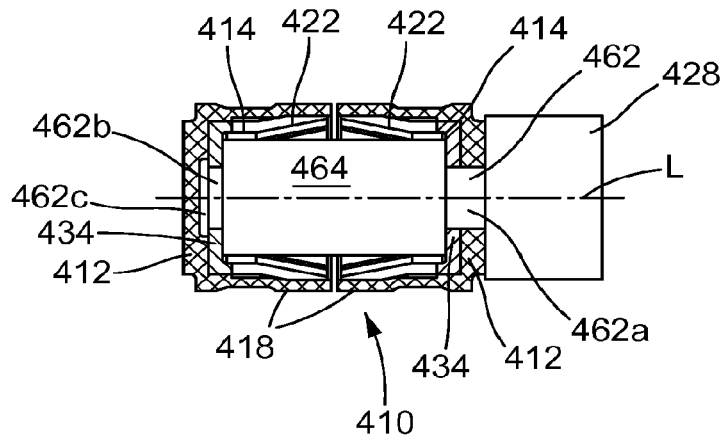
FIG. 8 is a longitudinal sectional view of a metering device with a fifth embodiment of a radial sliding seal subassembly according to the invention.

In FIG. 8 a radial sliding seal subassembly on a piston rod is again illustrated in a longitudinal section. Also, the components of this radial sliding seal subassembly of the fifth embodiment are very similar to those of the first and fourth embodiments. Accordingly identical structural parts in the fifth embodiment are provided with the same reference numerals as in FIGS. 1, 2 and 7, but in each case increased by 400 or 100. Otherwise reference is expressly made to the description of the first and fourth embodiments.

The fifth embodiment of FIG. 8 is discussed hereinafter only insofar as it differs from the already described embodiments 1 and 4.

The fifth embodiment of FIG. 8 too shows a radial sliding seal subassembly with two pretensioning components 414, which are completely identical to the pretensioning components 14 and 314 respectively of the first and fourth embodiments.

In contrast to the fourth embodiment of FIG. 7, the pretensioning components 414 and the sealing components 412 connected thereto are not arranged with their front sides adjacent, but with free longitudinal ends of their radial spring segments 422. Starting from these free longitudinal ends lying close to one another of the radial spring segments 422, both radial spring segments extend in each case in the axial direction to the longitudinal axis L of the piston rod 428, which is why the arrangement illustrated in FIG. 8 is also termed an "O-arrangement". The rivet 462 is formed correspondingly longer, a sleeve 464 being slipped over between the front sides (radial flange 434) of the pretensioning components 414, which serves to fix the right-hand pretensioning component 414 in FIG. 8 by means of the left-hand pretensioning component 414 and the rivet head 462c. Simply those sections of the rivet 462 that are surrounded by the radial flanges 434 and, in the case of the right-hand sealing component 412, also by its sealing material, are not enclosed by the sleeve 464. These sections are identified in FIG. 8 by the reference numerals 462a and 462b.

Also a very long sealing surface in the axial direction is achieved with the fifth embodiment illustrated in FIG. 8.

The invention claimed is:

1. A metering device comprising:
   a) a piston-cylinder arrangement comprising
      a cylinder, and
      a piston rod,
      wherein said piston rod and said cylinder extend in an axial direction and are movable relative to one another in said axial direction, and
   b) a radial sliding seal subassembly configured to seal a radial gap between the cylinder and the piston rod wherein said radial sliding seal subassembly comprises:
      a sealing component, and
      a plurality of identical pretensioning components cooperating with said sealing component,
      wherein the sealing component comprises a sealing section extending in said axial direction and in a circumferential direction, wherein said sealing section has a sealing surface facing in a first radial direction, and said sealing surface at least in the axial direction is in sliding contact with a working surface formed either on a side of the piston rod facing towards the cylinder, or on an inner side of the cylinder facing towards the piston rod, and wherein said sealing section has a pretensioning surface facing in a second radial direction opposite to the first radial direction and in engagement with the plurality of identical pretensioning components for transferring radial pretensioning force,
   wherein said identical pretensioning components are arranged one after the other in the axial direction, and
   wherein each identical pretensioning component comprises:
      a spring carrier, and
      a plurality of separate radial spring segments that are supported on the spring carrier such that said separate radial spring segments are resilient in at least the radial direction.

2. The metering device according to claim 1, wherein said plurality of identical pretensioning components are axially adjacent and are oriented in the same direction.

3. The metering device according to claim 1, wherein said plurality of identical pretensioning components are axially adjacent and are oriented in opposite directions.

4. The metering device according to claim 1, wherein said separate radial spring segments have a first and a second axial longitudinal end and at least one of said separate radial spring segments is connected at one axial longitudinal end to the spring carrier and said separate radial spring segments comprise a pretensioning axial section axially interspaced from the axial longitudinal end, said pretensioning axial section being in contact with the pretensioning surface on said sealing section.

5. The metering device according to claim 4, wherein the spring carrier comprises a carrier section extending in the circumferential direction, from which at least one radial spring segment projects in an axial direction.

6. The metering device according to claim 5, wherein the carrier section extends all the way around the spring carrier in the circumferential direction.

7. The metering device according to claim 5, wherein said plurality of separate radial spring segments project in an axial direction.

8. The metering device according to claim 7, wherein all separate radial spring segments project in an axial direction.

9. The metering device according to claim 7, wherein said separate radial spring segments project in the same axial direction.

10. The metering device according to claim 1, wherein said separate radial spring segments are arranged adjacently in the circumferential direction.

11. The metering device according to claim 5, wherein at least one radial spring segment is in one piece with the carrier section.

12. The metering device according to claim 11, wherein the identical pretensioning components are one-piece components.

13. The metering device according to claim 1, wherein the identical pretensioning components comprise a tubular section comprising
   a first and a second axial longitudinal end, and
   a plurality of adjacent axial slits in the circumferential direction, wherein the axial length of said adjacent axial slits is shorter than that of the tubular section.

14. The metering device according to claim 13, wherein the axial slits run from said first axial longitudinal end of the tubular section to said second axial longitudinal end of the tubular section.

15. The metering device according to claim 4, wherein the pretensioning axial section projects in a radial pretensioning direction with respect to the carrier section when said metering device is in an unloaded state.

16. The metering device according to claim 1, wherein at least one of the radial spring segments has a radial snap-lock projection on a side facing away from the pretensioning surface when said metering device is in an installed state.

17. The metering device according to claim 1, wherein each of the pretensioning components comprises a securement device configured to secure the sealing component and pretensioning component at least in the axial direction.

18. The metering device according to claim 17, wherein the securement device is securement projections.

19. The metering device according to claim 1, wherein at least one of the pretensioning components comprises a fastening section extending in a radial direction, for fastening said pretensioning components to the piston rod or the cylinder.

20. The metering device according to claim 19, wherein the fastening section is a radial flange.

21. The metering device according to claim 1, wherein each of the pretensioning components is at least partially metal.

22. The metering device according to claim 21, wherein the spring carrier and/or the radial spring segments of at least one pretensioning component is comprised of metal.

23. The metering device according to claim 1, wherein said metering device comprises a clamping force generating component movable relative to at least one of the pretensioning components between a first position, wherein the clamping force generating component co-operates with at least one of the pretensioning components in such a way that at least one of the pretensioning components exerts a lower radial pretensioning force on the sealing component, and a second position, wherein the clamping force generating component co-operates with at least one of the pretensioning components in such a way that the pretensioning component exerts a higher radial pretensioning force on the sealing component.

24. The metering device according to claim 1, wherein said cylinder and piston rod extend in an axial direction and are movable relative to one another in said axial direction, wherein the working surface is formed on the inner side of the cylinder, facing towards the piston rod.

25. The metering device according to claim 24, wherein each of the pretensioning components is secured to a part of the piston rod protruding into the cylinder.

26. The metering device according to claim 24, wherein each of the pretensioning components is riveted to and/or shrink-fitted on to the piston rod.

27. The metering device according to claim 24, wherein at least part of each of the pretensioning components is in one piece with a section of the piston rod.

28. The metering device according to claim 27, wherein each of the pretensioning components is in one piece with a section of the piston rod.

29. The metering device according to claim 1, wherein said cylinder and said piston rod extend in said axial direction and are movable relative to one another in said axial direction, wherein the working surface is formed on the side of the piston rod, facing towards the cylinder.

30. The metering device according to claim 1, wherein the sealing section extends all the way around said sealing component in the circumferential direction.

31. The metering device according to claim 1, wherein the sealing surface facing in said first radial direction is in sliding contact on said working surface extending in the axial direction and in the circumferential direction.

* * * * *